Dec. 19, 1961    G. J. WEBSTER ET AL    3,013,865
CARBON BLACK FURNACE DUAL FLUID INJECTOR
Filed Jan. 23, 1956    2 Sheets-Sheet 1
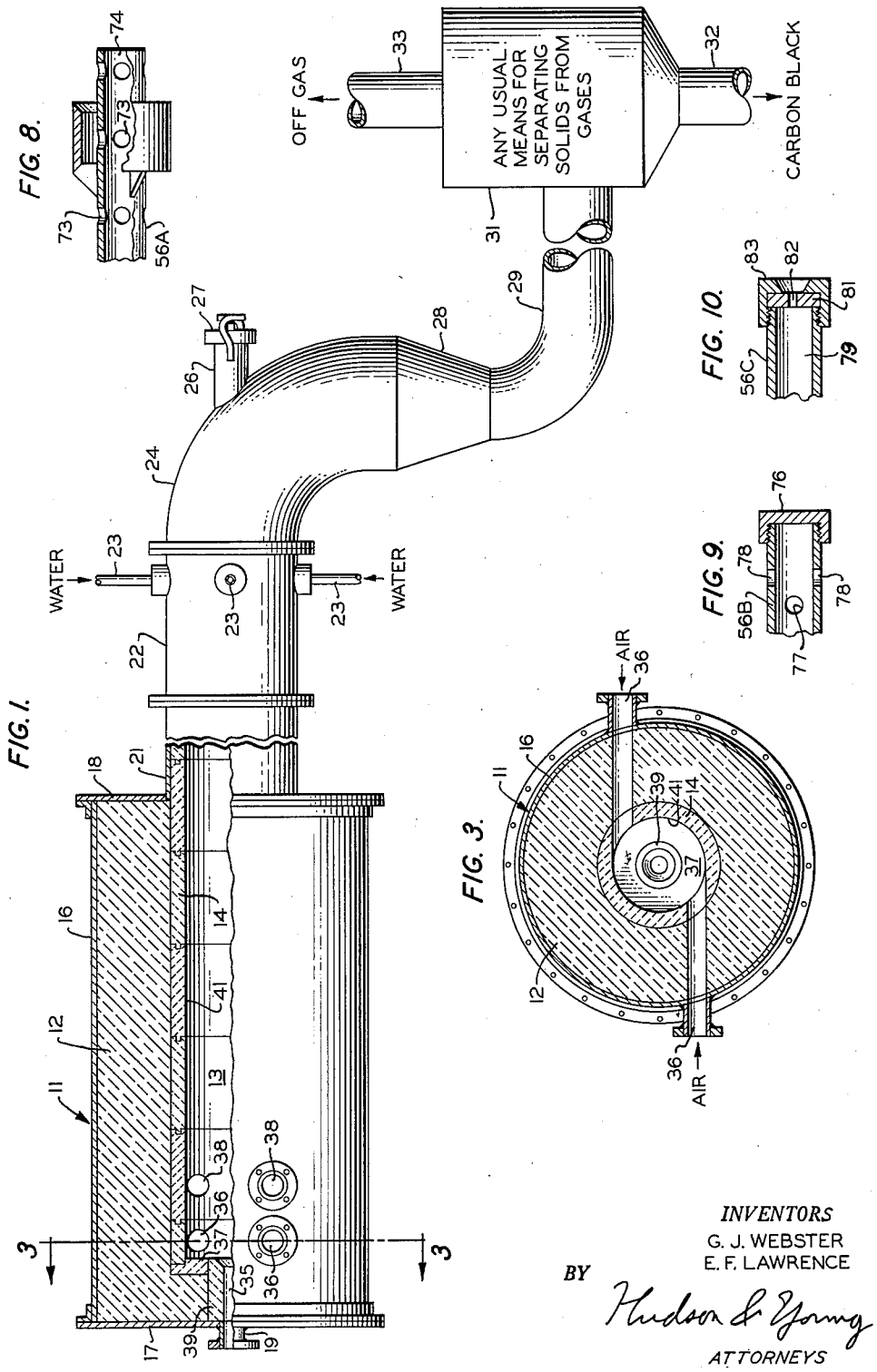
INVENTORS
G. J. WEBSTER
E. F. LAWRENCE
BY
Hudson & Young
ATTORNEYS

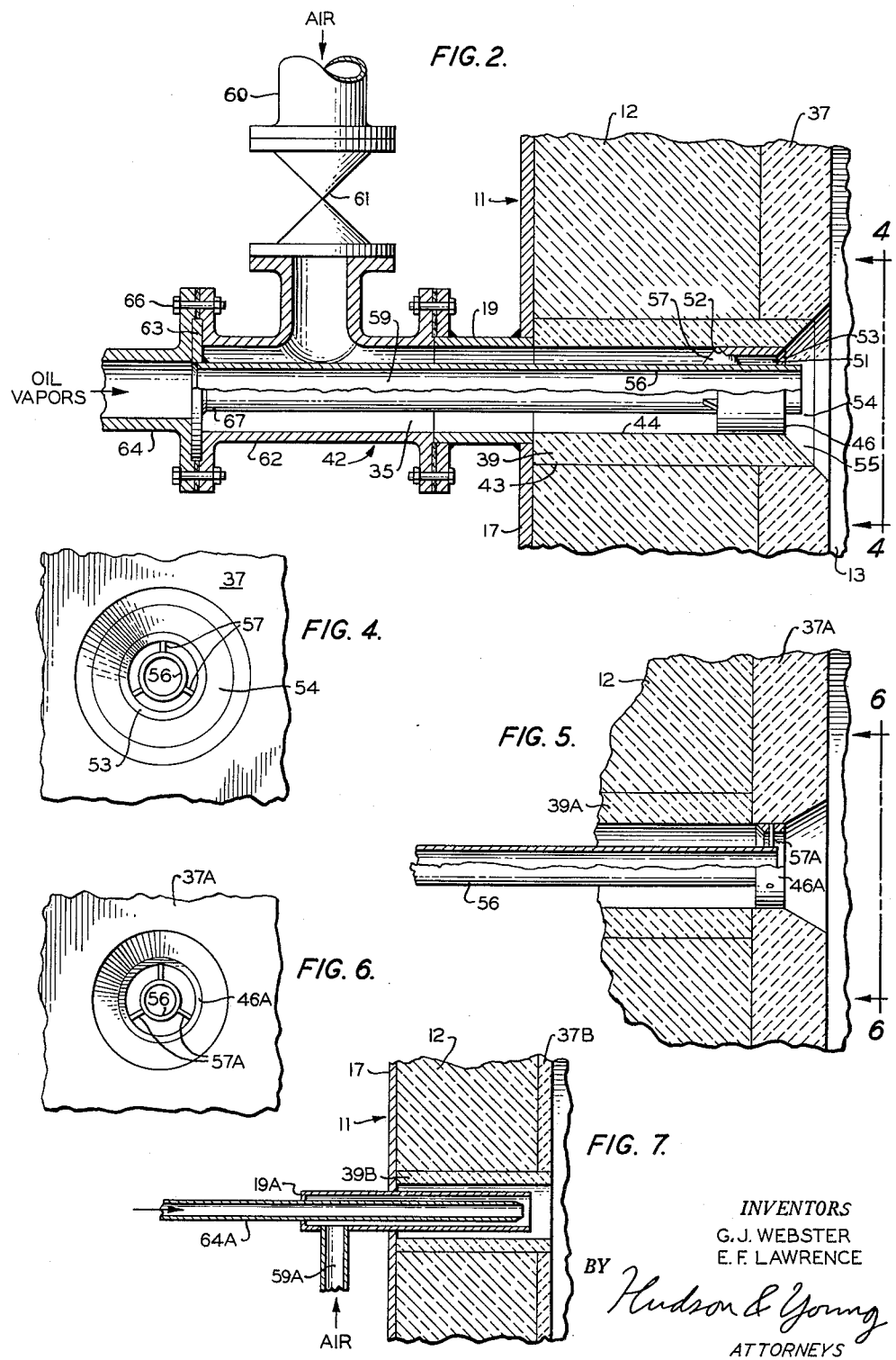

United States Patent Office 3,013,865
Patented Dec. 19, 1961

3,013,865
CARBON BLACK FURNACE DUAL FLUID INJECTOR
George J. Webster and Eugene F. Lawrence, Bartlesville, Okla., assignors to Phillips Petroleum Company, a corporation of Delaware
Filed Jan. 23, 1956, Ser. No. 560,776
14 Claims. (Cl. 23—259.5)

This invention relates to dual fluid injectors. In one aspect it relates to a dual fluid injector for the inlet of a carbon black furnace. In another aspect it relates to means for injecting, and/or mixing during injection, a pair of fluids, one of which may be a normally gaseous fuel gas, or a substantially vaporized normally liquid hydrocarbon, or a spray of liquid hydrocarbon, and the other of which may be an inert gas, free oxygen containing gas, or air.

In the prior art as shown by Ayers Re. 22,886, June 3, 1947; Krejci 2,375,795, May 15, 1945; Krejci, 2,564,700, August 21, 1951; and Arnold, 2,617,714, November 11, 1952; it has been old to introduce an annular sheath of air around the pipe from which a hydrocarbon gas or vapor, or spray of liquid is being introduced into the furnace. Considerable difficulty has been experienced in the commercial use of such equipment, after the same has been in use for long periods of time, because of the tendency of metal parts exposed to the heat of the furnace to melt, burn, and/or erode away, and for ceramic parts of the assembly to become melted, spalled, and/or eroded away, by the gases passing at high velocity therethrough, and the heat of adjacent flames. This destruction is accelerated if fuel gas, and especially hydrocarbons in liquid form, are allowed to contact the walls of the furnace. Furthermore, the construction of the parts tend to unduly restrict the free flow of fluids therethrough, resulting in high pressures being necessary to force the desired amount of fluid into the furnace.

It has been discovered that by making the dual fluid injectors for the furnace as disclosed in the present invention, that the life of the equipment is extended to desired quantity of fluid is reduced, the heating, melting, still longer periods, the pressure necessary to inject a desired quantity of fluid is reduced, the heating, melting, spalling and eroding of parts is greatly reduced, and the parts most subject to such destructive erosion are easily and quickly removed and replaced.

One object of the present invention is to provide a novel dual fluid injector.

Another object is to provide a novel carbon black furnace having such an injector.

Other objects are to provide such equipment in which heating, melting, spalling, and eroding, is substantially reduced, the life of parts is substantially increased, and the parts which are most subject to destruction and deformation are easily removed and replaced.

Numerous other objects and advantages will be apparent to those skilled in the art upon reading the accompanying specification, claims and drawings.

In the drawings:
FIGURE 1 is an elevational view of a carbon black furnace embodying the present invention with parts broken away to show details of construction of the same.

FIGURE 2 is a cross sectional view of a dual fluid injector disposed to discharge axially into the upstream end of the furnace shown in FIGURE 1.

FIGURE 3 is a cross sectional view of a portion of FIGURE 1 taken along the line 3—3 thereof, looking in the direction indicated.

FIGURE 4 is an enlarged view of the central portion of FIGURE 3 after the apparatus of FIGURE 2 is installed.

FIGURE 5 is a view similar to FIGURE 2 of a portion of a modified form of apparatus.

FIGURE 6 is an enlarged view of the central portion of FIGURE 5 taken along the line 6—6 thereof, looking in the direction indicated.

FIGURE 7 is representative of the prior art and is a view similar to FIGURE 2.

FIGURE 8 shows a further modification of the tube of FIGURE 2 useful when gas is being injected.

FIGURE 9 shows a further modification of the end of FIGURE 8.

FIGURE 10 shows a further modification of the tube of FIGURE 2 when liquid is being injected as a spray.

In FIGURE 1 is shown a carbon black furnace generally designated as 11, which in general arrangement is similar to that shown in Krejci 2,375,795 mentioned above. This type of furnace is chosen for illustrative purposes, but obviously the invention applied equally well to any of the carbon black furnaces shown in the other patents listed above, or to any other type of carbon black furnace having a heat insulated body 12 with a reaction chamber 13 therein.

While the entire furnace body could be made out of a ceramic material of any type, it is preferred to construct the furnace out of a less expensive heat insulating material 12, such as a castable heat insulating cement, and line the same with a layer of more expensive, more heat resistant blocks of ceramic 14. It is also preferred to provide a metallic housing 16 around the outside of the furnace, which metallic housing may be made in sections fastened together by any suitable means, such as nuts and bolts (not shown). This metallic housing includes end plates 17 and 18 to which a metal supply pipe 19 and outlet pipe 21 may be secured by suitable means, such as welding.

In FIGURE 1 the furnace 11 is shown in its usual environment, with a water spray quench 22 connected to outlet 21 downstream of the same and communicating therewith, in which quench water from pipes 23 is sprayed into the effluent gases cooling the same, after which the remaining equipment downstream does not need any ceramic lining. The present invention being in the furnace, the equipment employed downstream may be any such that is old in the carbon black art. For purposes of illustration a right angle bend 24 is shown attached to quench 22 provided with a peephole tube 26 covered by a closure 27. Said turn 24 is connected in series to reducer 28, conduit tube 29, and any known means 31 for separating solid carbon black in pipe 32 from the off-gas in pipe 33.

Returning to the construction of furnace 11, chamber 13 can be a single cylindrical chamber as shown, or it can be generally cylindrically with an enlarged diameter portion (not shown) as in Krejci 2,564,700 above. Chamber 13 is provided with one or more fluid inlets 35 and/or 36, 38, the details of which are shown better in the other figures. The ceramic lining plates or tubes 14 include annular end plate 37 and a ceramic tube 39 having a cylindrical exterior fitting the furnace and a cylindrical bore.

Inlet 35 is disposed axially of furnace chamber 13 whereas inlets 36 and 38 are disposed approximately tangent to the inner cylindrical surface 41 of the chamber 13.

Details of construction of the axial fluid inlet 35 and related parts are shown in FIGURE 2. The carbon black furnace 11 comprises a heat insulated body 12 having a reaction chamber 13 therein, the relation of the inlet passage 35 and outlet passage 21 being shown in FIGURE 1. In FIGURE 2 a metallic housing 17 is disposed around said furnace 11, and a dual fluid injector generally designated as 42 is formed comprising a first ceramic tube 39 fitted in inlet passage 43, said first tube 39 having a cylindrical shaped bore 44. A second metal tube 46 of lesser length than the cylindrical portion 44 of said first tube has a close sliding fit in the bore 44, and is disposed therein, said second tube 46 having a cylindrical bore 51 the ends 52 and 53 of which are preferably flared outwardly to merge with the cylindrical surface 44 and diverging surface 55 of said ceramic tube 39 to aid streamline flow of a first fluid therethrough.

A third tube 56 for the injection of a second fluid into said furnace extends from the exterior of said furnace axially into and spaced from the inner cylindrical wall 51 of said second tube by radial lugs 57 secured to said second and third tubes, preferably by welding, to aid the flow of said first fluid into said furnace through the annulus between said second and third tubes, and to center tube 56 accurately so as to distribute the flow of said first fluid evenly around said second fluid and thereby prevent contact of said second fluid with the furnace walls.

Said third tube 56 may end anywhere adjacent said cylindrical bore 51, but preferably extends entirely through said cylindrical bore. Said tube 56 may have a cylindrical bore 59 provided with open ends as shown in FIGURE 2, which is particularly adopted to the injection of substantially vaporized normally liquid hydrocarbons into the furnace. If the second fluid injected is gas, or a liquid spray, tube 56 may still be made as shown in FIGURE 2, but to obtain the best possible results with gas it is preferred to substitute for tube 56 the tube 56A of FIGURE 8 or 56B of FIGURE 9, and when the second fluid in bore 59 is a liquid which is to be sprayed into the furnace, it is preferred to substitute for tube 56 the tube 56C of FIGURE 10. In FIGURES 5, 7, 8, 9, and 10 the tubes 56A, 56B and 56C are shown extending in the same direction as tube 56 of FIGURE 2, and they will be explained further when these figures are described below.

In FIGURE 2 a first metal supply pipe 60 for said first fluid may contain a cut off valve 61, and may comprise a T 62 and nipple 19 secured to the end plate 17 of the metallic housing 16 around and in communication with the bore 44 of said first tube 39, said third tube 56 passing through the wall of said first pipe 59, being shown passing through and secured to a metal washer 63 forming a portion of the wall of said first pipe and being supported thereby in its said position. A supply pipe 64 for a second fluid is secured by nuts and bolts 66 in communication with the end 67 of said third tube and thus enables said first pipe 59 to support the washer 63 and third tube 56.

FIGURE 3 is a cross sectional view of a portion of FIGURE 1 taken along the line 3—3 thereof looking in the direction indicated. As all the parts are the same as in FIGURES 1 and 2, and have the same numerals applied thereto, it is believed unnecessary to further describe this figure.

FIGURES 4 and 6 being respectively end views of a portion of FIGURES 2 and 5, respectively taken along lines 4—4 and 6—6, respectively, looking in the direction indicated, need no further description.

FIGURE 5 shows a portion of a modified form of furnace and dual fluid injector similar to corresponding parts of FIGURE 2. The ceramic end plate 37A extends inwardly to form a cylindrical opening in which the second tube 46A is positioned, the tube 39A ending flush against plate 37A, while second tube 46A is secured by pins to third tube 56 which is identical to tube 56 in FIGURE 2, even though it ends inside tube 46A instead of extending entirely through the same.

FIGURE 7 is a view similar to FIGURE 2 of a typical dual fluid injector of the prior art. The furnace 11 has heat insulation 12, and ceramic end plate 37B and inlet liner 39B extending through a hole in the end plate. Tube 19A is inserted through metal casing 19A into the bore of 39B and tube 64A extends into tube 19A, while air supply 59A is connected to tube 19A as shown. It will be seen that the full diameter of tube 39B is not utilized, and that much greater pressure is necessary to supply the fluids through the resulting smaller passages than in the present invention.

The details of the downstream end of pipe 56A are shown in FIGURE 8, where it will be seen that said third tube 56A is provided with radial gas outlets 73 preferably adjacent said cylindrical bore 51. In FIGURE 8 the downstream end of tube 56A is open at 74, so that some of the gas emerges at 74 as well as at openings 73.

When more thorough mixing of gas is desired, it is preferred to use the modification shown in FIGURE 9 in which the downstream end of the third tube 56B is completely closed at 76, and the radial holes 77 and 78 are staggered. The operation of tube 56B in FIGURE 9 is the same as tube 56A in FIGURE 8.

When the second fluid being injected is in a liquid phase, it is preferred to inject the same through cylindrical bore 79 of tube 56C of FIGURE 10, the downstream end of which is provided with a spray nozzle of any known design, the one shown being the simplest available, consisting of an orifice plate 81 containing a restricted orifice 82 which may be secured to the end of the pipe by a union 83.

As pointed out above, in the prior art shown in the various patents listed above, and other uncited patents in the prior art, the fluid injected through these dual fluid injectors may be normal gases, or in the case of tube 56 of FIGURE 2 may be a substantially vaporized normally liquid hydrocarbon. By substantially vaporized it is intended to cover all mixtures of from 80% vapor and 20% liquid up to 100% vapor, as it has been found that a tube like 56 can efficiently handle either gases, or vapors containing up to 20% liquid, without any difficulty. When the second fluid handled is a gas, and it is desired to mix the first and second fluid, it is preferred to use the mixing tubes 56A or 56B of FIGURES 8 or 9. When the second fluid is a liquid, to be sprayed as such into the furnace, it is preferred to replace tube 56 of FIGURE 2 or tube 56A of FIGURE 8 with tube 56C having a spray nozzle as shown in FIGURE 10. All the equipment used in FIGURES 2, 5, 8, 9 and 10 are completely interchangeable, and when it is desired to have dual fluid injection in tangential inlets 36 and/or 38 the equipment of these figures is inserted therein in exactly the same manner as it is applied to axial inlet 19.

While for illustrative purposes there has been shown in FIGURES 1, 2, and 3 a furnace of the type in which a substantially vaporized normally liquid hydrocarbon, such as gas oil, is introduced axially into the furnace through pipe 56 surrounded by an annular sheath of air coming through passage 44, and air is discharged through tangential passages 36 and 38 to pass helically into chamber 13 as an annulus surrounding the vaporized hydrocarbon from axial pipe 56, it is to be distinctly understood that the invention is not limited to this specific embodiment, as by replacing pipe 56 of FIGURE 2 with one of respective pipes 56; 56A; 56B; or 56C; it is possible to have the second fluid be substantially vaporized liquid, or liquid spray, coming through tube 56 axially, and the air coming through passages 36 and/or 38 tangentially of the furnace, can be augmented by a fuel gas, or vaporized hydrocarbon coming in through a central pipe 56, or by a fuel gas coming in through a mixing pipe such as 56A and 56B, or by a liquid spray through pipe 56C with a spray nozzle, any combination of the four types of fluids named being suitable for introduction either axially and/or tangentially to the furnace as described.

By intermixed gas, the gas coming in pipe 56B for example can be natural gas, methane 90% or more, the remainder nitrogen, carbon dioxide, lighter hydrocarbons and hydrogen, and the gas it is mixed with a free oxygen containing gas, usually, air but sometimes oxygen, oxygen and combustion gases, or similar gases.

It has been found that the parts which are first, and most, subject to deterioration, are tubes 56, 56A, 56B and 56C, the downstream ends of which are exposed most to the heat, and the second metal tube 46 which forms a venturi restriction and is therefore exposed to the highest fluid velocities, and it will be noted these parts are easily removable and replaceable without tearing down the furnace. Merely remove nuts 66 in FIGURE 2, and pull out washer 63, pipe 56 and tube 46 attached thereto, even if an easily fracturable gas sealing cement is placed between tubes 46 and 39, as is sometimes desired, but is not generally necessary.

EXAMPLE

In order to provide a comparative example of the present invention and the prior art, tests were run on identical furnaces A and B, furnace A being that shown in FIGURES 1 and 3 with the equipment shown in FIGURE 2 installed in the axial inlet 19, and furnace B being the same as furnace A except that in place of the equipment of FIGURE 2, that of FIGURE 7 was installed in the axial inlet 19.

The same gas oil, vaporized to the same extent, and at the same temperature, was injected through pipe 56 of furnace A and pipe 64A of furnace B. Air was injected through space 44 of furnace A, pipe 59A of furnace B, and inlets 36 and 38 of both furnaces. The resulting carbon black was tested for quantity, and also tested for quality in the usual evaluation tests in rubber mixtures using the same rubber compositions. The operating conditions and results are presented in Table I, in which the oil rate is given in gallons per hour, the photelometer (Phot.) in percent light transmission of a standard extract of soluble tarry material from the carbon black in a standard solvent compared to the pure solvent, the Bureau of Mines Correlation Index (BMCI) of the oil being substantially the same, the jacket air (passages 44 and 59A) and total air (includes passages 36 and 38) being given in thousand standard cubic feet per hour, the yield of carbon black in pounds per gallon of oil, and the production (Prod.) of carbon black in pounds per hour per furnace, and the air/oil ratio in M. s.c.f./gal in column 9 being obtained by dividing the numbers in column 6 by the respective number in column 2, as follows:

*Table I*

| Furnace Type and Run No. | Oil Rate, g.p.h. | Phot., Percent | BMCI of Oil | Jacket Air, M. s.c.f.h | Total Air M.s.c.f.h. | Yield, lb./gal. | Prod., lbs./hr. | Air/Oil |
| --- | --- | --- | --- | --- | --- | --- | --- | --- |
| (Control): | | | | | | | | |
| B, 1 | 139.2 | 69 | 90 | 3.32 | 57.6 | 3.97 | 553 | .414 |
| B, 2 | 133.5 | 73 | 91 | 3.29 | 53.3 | 4.19 | 568 | .399 |
| B, 3 | 124.9 | 70 | 91 | 4.15 | 49.8 | 4.04 | 503 | .398 |
| B, 4 | 103.0 | 71 | 90 | 3.92 | 39.6 | 4.21 | 434 | .386 |
| (Invention): | | | | | | | | |
| A, 5 | 138.2 | 70 | 91 | 4.71 | 40.20 | 5.08 | 702 | .291 |
| A, 6 | 138.6 | 75 | 91 | 3.11 | 40.38 | 5.04 | 698 | .291 |
| A, 7 | 119.3 | 71 | 92 | 3.14 | 34.04 | 5.08 | 606 | .285 |
| A, 8 | 117.8 | 69 | 92 | 4.58 | 34.48 | 5.05 | 595 | .293 |
| (Control Average) | 125.1 | 71 | 91 | 3.67 | 50.1 | 4.10 | 514 | .40 |
| (Invention Average) | 128.5 | 71 | 91 | 3.88 | 37.3 | 5.06 | 650 | .29 |

The carbon blacks produced in runs B, 1; A, 5; A, 6 and A, 7 were tested in rubber and were substantially equal in quality, as shown in Table II, the tests being those standard tests common in the art of testing rubber, with the following results:

*Table II*

RUBBER EVALUATION DATA

[45 minute cure]

| Furnace Type and Run No. | Mooney ML4 at 212° F. | 300% Modulus, p.s.i. | Ultimate | | Shore A Hardness | Compression set | Abrasion Index, Percent |
| --- | --- | --- | --- | --- | --- | --- | --- |
| | | | Tensile, p.s.i. | Elong., Percent | | | |
| B, 1 | 44.5 | 1,605 | 2,260 | 440 | 63 | 24.0 | 100 |
| A, 5 | 45 | 1,650 | 2,420 | 430 | 64 | 24.4 | 102 |
| A, 6 | 45 | 1,630 | 2,250 | 410 | 63 | 25.4 | 104 |
| A, 7 | 45 | 1,630 | 2,300 | 440 | 63 | 23.5 | 88 |

From the data in Tables Nos. I and II it is apparent that both the yield in pounds of carbon black per gallon of oil, and the total production, were increased about 23% and 26% respectively in furnace A of the present invention over furnace B of the prior art, solely by the use of the present invention, which is an unexpected result.

In addition, an obvious result was that the air pressure necessary to force air at the same rate through passage 44 of FIGURE 2 was considerably less than that required to force air at that rate through 59A of FIGURE 7.

Obviously, therefore, the invention is not limited to the specific embodiment described in the specification for illustrative purposes, and the furnace may have chambers of any shape known to the prior art as well as the generally cylindrical structure shown as chambers 13 in the drawings, and any combination of one or more dual fluid injectors in the furnace known to the prior art may be employed in this invention.

Having described our invention, we claim:

1. A carbon black furnace comprising in combination a heat insulating body having a reaction chamber therein, an inlet and an outlet passage communicating between the interior of said chamber and the exterior of said furnace, a metallic housing around said furnace, a dual fluid injector comprising a first ceramic tube fitted in said inlet passage, said first tube having a first cylindrical bore, a second metal tube of lesser length than said first cylindrical bore having a cylindrical external surface adapted and disposed to fit into said first bore adjacent the downstream end thereof, said second tube having a second cylindrical bore the ends of which are flared outwardly to merge with the surfaces of said first bore to aid streamline flow of a first fluid therethrough, and a third tube for the injection of a second fluid into said furnace extending from the exterior of said furnace axially into and spaced from the inner cylindrical wall of said second tube by radial lugs secured to said second tube and to said third tube to aid the flow of said fluid into said furnace through the annulus between said second and third tubes, a first metal supply pipe for said first fluid secured to said metallic housing around and in communication with the bore of said first tube, said third tube passing through the wall of said first pipe and being supported thereby in its said position, and a supply pipe for said second fluid secured in communication with said end of said third tube supported by said first pipe.

2. A carbon black furnace comprising in combination a heat insulating body having a reaction chamber therein, an inlet and an outlet passage communicating between the interior of said chamber and the exterior of said furnace, a metallic housing around said furnace, a dual fluid injector comprising a first ceramic tube fitted in said inlet passage, said first tube having a first cylindrical bore, a second metal tube of lesser length than said first bore having a cylindrical external surface adapted and disposed to fit into said first bore adjacent the downstream end thereof, said second tube having a second cylindrical bore to aid flow of a first fluid therethrough, and a third tube for the injection of a second fluid into said furnace extending from the exterior of said furnace axially into and spaced from the inner cylindrical wall of said second tube by radial lugs secured to said second tube and said third tube to aid the flow of said first fluid into said furnace through the annulus between said second and third tubes, a first metal supply pipe for said first fluid secured to said metallic housing around and in communication with the bore of said first tube, said third tube passing through the wall of said first pipe and being supported thereby in its said position, and a supply pipe for said second fluid secured in communication with said end of said third tube supported by said first pipe.

3. A carbon black furnace comprising in combination a heat insulating body having a reaction chamber therein, an inlet and an outlet passage communicating between the interior of said chamber and the exterior of said furnace, a metallic housing around said furnace, a dual fluid injector comprising a first ceramic tube fitted in said inlet passage, said first tube having a first cylindrical bore, a second metal tube of lesser length than said first bore having a cylindrical external surface adapted and disposed to fit into said first bore adjacent the downstream end thereof, said second tube having a second cylindrical bore the ends of which are flared outwardly to merge with the surfaces of said first bore to aid streamline flow of a first fluid therethrough, and a third tube for the injection of a second fluid into said furnace extending from the exterior of said furnace axially into and spaced from the inner cylindrical wall of said second tube to aid the flow of said first fluid into said furnace through the annulus between said second and third tubes, a first metal supply pipe for said first fluid secured to said metallic housing around and in communication with the bore of said first tube, said third tube passing through the wall of said first pipe and being supported thereby in its said position, and a supply pipe for said second fluid secured in communication with said end of said third tube supported by said first pipe.

4. A carbon black furnace comprising in combination a heat insulating body having a reaction chamber therein, an inlet and an outlet passage communicating between the interior of said chamber and the exterior of said furnace, a metallic housing around said furnace, a dual fluid injector comprising a first ceramic tube fitted in said inlet passage, said first tube having a first cylindrical bore, a second metal tube of lesser length than said first bore having a cylindrical external surface adapted and disposed to fit into said first bore adjacent the downstream end thereof, said second tube having a second cylindrical bore to aid flow of a first fluid therethrough, and a third tube for the injection of a second fluid into said furnace extending from the exterior of said furnace axially into and spaced from the inner cylindrical wall of said second tube to aid the flow of said first fluid into said furnace through the annulus between said second and third tubes, a first metal supply pipe for said first fluid secured to said metallic housing around and in communication with the bore of said first tube, said third tube passing through the wall of said first pipe and being supported thereby in its said position, and a supply pipe for said second fluid secured in communication with said end of said third tube supported by said first pipe.

5. The combination of claim 1 in which said third tube extends through said second cylindrical bore, said third tube is provided with a closed end adjacent said second cylindrical bore, and said third tube is provided with radial fluid outlets adjacent said second cylindrical bore, whereby mixing of said first and second fluids is accomplished adjacent said second cylindrical bore where the velocity of said first fluid is the greatest and its pressure the least.

6. The combination of claim 1 in which said third tube is provided with a closed end adjacent said second cylindrical bore, and said third tube is provided with radial fluid outlets adjacent said second cylindrical bore.

7. The combination of claim 1 in which said third tube is provided with radial fluid outlets adjacent said second cylindrical bore.

8. The combination of claim 1 in which said third tube extends through said second cylindrical bore, and said third tube is provided with radial fluid outlets adjacent said second cylindrical bore.

9. The combination of claim 1 in which said third tube extends through said second cylindrical bore.

10. A dual fluid injector for a carbon black furnace comprising in combination a first ceramic tube constructed and disposed to form a fluid inlet of said furnace, said first tube having a first cylindrical bore, a second metal tube of lesser length than said first cylindrical bore having a cylindrical external surface adapted and disposed to fit into said first cylindrical bore adjacent the downstream end thereof, said second tube having a second cylindrical bore to aid flow of a first fluid therethrough, and a third tube for the injection of a second fluid into said furnace extending from the exterior of said furnace axially into and spaced from the inner cylindrical wall of said second tube to aid the flow of said first fluid into said furnace through the annulus between said second and third tubes, in which said third tube extends through said second cylindrical bore, said third tube is provided with a closed end adjacent said second cylindrical bore, and said third tube is provided with radial fluid outlets adjacent said second cylindrical bore, whereby mixing of said first and second fluids is accomplished adjacent said second cylindrical bore where the velocity of said first fluid is the greatest and its pressure the least.

11. A dual fluid injector for a carbon black furnace comprising in combination a first ceramic tube constructed and disposed to form a fluid inlet of said furnace, said first tube having a first cylindrical bore, a second metal tube of lesser length than said first cylindrical bore having a cylindrical external surface adapted and disposed to fit into said first cylindrical bore adjacent the downstream end thereof, said second tube having a second cylindrical bore to aid flow of a first fluid therethrough, and a third tube for the injection of a second fluid into said furnace extending from the exterior of said furnace axially into and spaced from the inner cylindrical wall of said second tube to aid the flow of said first fluid into said furnace through the annulus between said second and third tubes, in which said third tube is provided with a closed end adjacent said second cylindrical bore, and said third tube is provided with radial fluid outlets adjacent said second cylindrical bore.

12. A dual fluid injector for a carbon black furnace comprising in combination a first ceramic tube constructed and disposed to form a fluid inlet of said furnace, said first tube having a first cylindrical bore, a second metal tube of lesser length than said first cylindrical bore having a cylindrical external surface adapted and disposed to fit into said first cylindrical bore adjacent the downstream end thereof, said second tube having a second cylindrical bore to aid flow of a first fluid therethrough, and a third tube for the injection of a second fluid into said furnace extending from the exterior of said furnace axially into and spaced from the inner cylindrical wall of said second tube to aid the flow of said first fluid into said furnace through the annulus between said second and third tubes, in which said third tube extends through said second cylindrical bore, and said third tube is provided with radial fluid outlets adjacent said second cylindrical bore.

13. A dual fluid injector for a carbon black furnace comprising in combination a first ceramic tube constructed and disposed to form a fluid inlet of said furnace, said first tube having a first cylindrical bore, a second metal tube of lesser length than said first cylindrical bore having a cylindrical external surface adapted and disposed to fit into said first cylindrical bore adjacent the downstream end thereof, said second tube having a second cylindrical bore to aid flow of a first fluid therethrough, and a third tube for the injection of a second fluid into said furnace extending from the exterior of said furnace axially into and spaced from the inner cylindrical wall of said second tube to aid the flow of said first fluid into said furnace through the annulus between said second and third tubes, in which said third tube extends through said second cylindrical bore.

14. The combination of claim 1 in which the downstream end of said third tube is provided with a liquid spray nozzle.

References Cited in the file of this patent
UNITED STATES PATENTS

| | | |
|---|---|---|
| 864,589 | Zimmerman | Aug. 27, 1907 |
| 1,484,693 | Wegscheider | Feb. 26, 1924 |
| 1,575,369 | Juillard | Mar. 2, 1926 |
| 1,581,984 | Rossatti | Apr. 20, 1926 |
| 1,773,002 | Hunt | Aug. 12, 1930 |
| 1,844,315 | Forney | Feb. 9, 1932 |
| 1,874,002 | Fantz | Aug. 30, 1932 |
| 2,047,570 | Wiltshire | July 14, 1936 |
| 2,121,463 | Wisdom | June 21, 1938 |
| 2,562,874 | Weischselbaum | July 31, 1951 |
| 2,564,700 | Krejci | Aug. 21, 1951 |
| 2,617,714 | Arnold | Nov. 11, 1952 |

FOREIGN PATENTS

| | | |
|---|---|---|
| 593,939 | Germany | Mar. 6, 1934 |